US011878901B2

(12) United States Patent
Brown et al.

(10) Patent No.: US 11,878,901 B2
(45) Date of Patent: Jan. 23, 2024

(54) BEVERAGE VALVE ASSEMBLY MOUNTING ASSEMBLY

(71) Applicant: Manitowoc Foodservice Companies, LLC, Manitowoc, WI (US)

(72) Inventors: James Wallace Brown, Crestwood, KY (US); Bruce Burton, Crestwood, KY (US)

(73) Assignee: WELBILT FOODSERVIE COMPANIES, LLC, New Port Richey, FL (US)

( * ) Notice: Subject to any disclaimer, the term of this patent is extended or adjusted under 35 U.S.C. 154(b) by 0 days.

(21) Appl. No.: 13/667,478

(22) Filed: Nov. 2, 2012

(65) Prior Publication Data

US 2013/0112708 A1 May 9, 2013

Related U.S. Application Data

(60) Provisional application No. 61/555,223, filed on Nov. 3, 2011.

(51) Int. Cl.

*B67D 1/00* (2006.01)
*B67D 1/14* (2006.01)
*B67D 7/06* (2010.01)
*B67D 7/74* (2010.01)

(52) U.S. Cl.

CPC ......... *B67D 1/0046* (2013.01); *B67D 1/0085* (2013.01); *B67D 1/1444* (2013.01); *B67D 2001/0093* (2013.01); *B67D 2001/0094* (2013.01); *B67D 2210/0006* (2013.01); *B67D 2210/00028* (2013.01)

(58) Field of Classification Search

CPC .. B67D 1/0021; B67D 1/0044; B67D 1/0085; B67D 1/1444; B67D 1/0046; B67D 2001/0089; B67D 2001/0094; B67D 2001/0093; B67D 2210/00028; B67D 2210/0006

USPC ....................... 222/129.1, 505, 129.2–129.4; 137/625.19, 625.41, 625.47

See application file for complete search history.

(56) References Cited

U.S. PATENT DOCUMENTS

| | | | |
|---|---|---|---|
| 1,428,933 | A * | 9/1922 | Bean, Jr. |
| 3,602,253 | A | 8/1971 | Bahout et al. |
| 4,497,343 | A * | 2/1985 | Brown et al. |

(Continued)

OTHER PUBLICATIONS

International Search Report dated Jan. 31, 2013 for PCT application No. PCT/US2012/063285.

(Continued)

*Primary Examiner* — Frederick C Nicolas

(74) *Attorney, Agent, or Firm* — Ohlandt, Greeley and Perle, LLP

(57) ABSTRACT

A mounting assembly includes a beverage mounting assembly having a housing. The housing has a housing wall that surrounds a cavity. A valve body is connectable to the beverage mounting assembly. The valve body is connectable to the beverage mounting assembly via a clip. The clip is insertable into both the housing and the valve body to connect the valve body to the beverage mounting assembly. At least one actuator is disposed in the cavity of the housing. The actuator rotates from a closed position to an open position that actuates pressure to the valve body from a liquid source. The actuator is separate from the clip that connects the housing to the valve body.

9 Claims, 9 Drawing Sheets

(56) References Cited

U.S. PATENT DOCUMENTS

| | | | |
|---|---|---|---|
| 5,285,815 | A * | 2/1994 | Henry et al. |
| 5,303,849 | A * | 4/1994 | Credle, Jr. |
| 5,685,458 | A * | 11/1997 | Durham et al. |
| 5,931,348 | A * | 8/1999 | Guadalupi |
| 5,984,142 | A * | 11/1999 | Castaldi |
| 6,328,181 | B1 * | 12/2001 | Schroeder et al. |
| 6,547,100 | B2 * | 4/2003 | Phillips et al. |
| 6,588,725 | B1 | 7/2003 | Wisnieski et al. |
| 6,866,826 | B2 | 3/2005 | Moore et al. |
| 8,534,498 | B2 * | 9/2013 | Campbell et al. |
| 2005/0269360 | A1 * | 12/2005 | Piatnik et al. |
| 2009/0065529 | A1 * | 3/2009 | Guadalupi |

OTHER PUBLICATIONS

Written Opinion dated Jan. 31, 2013 for PCT application No. PCT/US2012/063285.

International Preliminary Report (IPRP) dated Oct. 29, 2013 for PCT application No. PCT/US2012/063285.

Office Action dated Dec. 4, 2015 for corresponding Chinese patent application No. 201280065983.6, p. 40.

Chinese Office Action dated Aug. 22, 2016 for Chinese application No. 201280065983.6.

European Office Action dated Feb. 27, 2017 for European application No. 12 845 834.6.

Canadian Office Action dated Jun. 20, 2016 for Canadian application No. 2,857,148.

Office Action dated Mar. 17, 2017 for corresponding Chinese patent application No. 201280065983.6.

* cited by examiner

BEVERAGE VALVE ASSEMBLY MOUNTING ASSEMBLY

CROSS REFERENCE TO RELATED PATENT APPLICATIONS

This application claims the benefit of U.S. Provisional Application No. 61/555,223, filed Nov. 3, 2011. The contents of U.S. Provisional Application No. 61/555,223, filed Nov. 3, 2011, are hereby incorporated herein by reference in their entirety.

BACKGROUND

1. Field of the Disclosure

The present disclosure relates to a mounting assembly that connects a source of flavor ingredients and/or water, carbonated or still, to a valve body of a beverage valve assembly to provide greater clearance to a component of the mounting assembly that actuates pressure to the valve body from the source of flavor ingredients and/or water. In addition, the present disclosure relates to a mounting assembly that separates connection of the mounting assembly to a valve body of a beverage valve assembly and actuation of pressure to the valve body from a source of flavor ingredients and/or water, carbonated or still.

2. Description of the Related Art

Currently restaurants serve a variety of beverages such as carbonated drinks and non-carbonated drinks by use of beverage valve assemblies. The beverage valve assemblies, for example, a plurality of beverage valve assemblies 1100*a*, 1100*b*, 1100*c* and 1100*d* shown in FIG. 1, mix and dispense carbonated and non-carbonated beverages. Plurality of beverage valve assemblies 1100*a*, 1100*b*, 1100*c* and 1100*d* are similar to one another, and, accordingly, only one of the plurality of beverage valve assemblies 1100*a* is described herein. Beverage valve assembly 1100*a* has a cover 1102 that covers controls (not shown) and valves connected to a valve body (not shown) that control and mix flavor ingredients, for example, cola or lemonade, and carbonated water and/or still water to form a beverage. Cover 1102 protects internal valve assembly components such as solenoids, flow controls, electronics, and the like. Beverage valve assembly 1100*a* has a nozzle 1104 and lever 1106. A force is applied to lever 1106 to move lever from front to back to actuate a control to mix flavor ingredients and carbonated water and/or still water to form the beverage and dispenses the beverage through nozzle 1104 into a container such as a cup as is known in the art. Beverage valve assembly 1100*a* has a beverage valve assembly housing 1108 having a dispenser wall connected to beverage valve assembly 1100*a* and a surface 1110 adjacent cover 1102 forming an upper space 1112 therebetween. Beverage valve assembly housing 1108 forms a lower space 1113 below nozzle 1104.

FIG. 2 is another exemplary embodiment of a plurality of beverage valve assemblies 1200*a* and 1200*b*. Beverage valve assemblies 1200*a* and 1200*b* are similar to beverage valve assembly 1100*a*, and, thus, similar features include the same reference numerals. Each of beverage valve assemblies 1200*a* and 1200*b* has beverage valve assembly housing 1108 having surface 1110 adjacent cover 1102 forming a space 1112*a* therebetween. Space 1112*a* has a decreasing size from between surface 1110 and cover 1102 at beverage valve assembly 1200*b* to between surface 1110 and cover 1102 at beverage valve assembly 1200*a*.

Spaces 1112 and 1112*a* are narrow making it difficult to connect and disconnect beverage valve assemblies 1100*a*, 1100*b*, 1100*c*, 1100*d*, 1200*a* and 1200*b* to carbonated and/or still water sources and flavor ingredient sources. Finger and hand clearance in spaces 1112 and 1112*a* cause frustration and delay for installers and service technicians because access to the upper-back region of the beverage valve assemblies through spaces 1112 and 1112*a* is required to install and remove the source of flavor ingredients and/or carbonated or still water for service.

Accordingly, there is a need for a method and apparatus that connects a valve body of a beverage valve assembly to a water source, carbonated and/or still, and/or flavor ingredient source with a component at a lower portion of the apparatus that actuates pressure to the valve body from the water source and/or flavor ingredient source. There is a further need for a method and apparatus to connect and disconnect a valve body of a beverage valve assembly to a water source, carbonated and/or still, and/or flavor ingredient source and separately actuate pressure to the valve body from the water source and/or flavor ingredient source.

SUMMARY OF THE DISCLOSURE

There is provided a mounting assembly that includes a beverage mounting assembly having a housing. The housing has a housing wall that surrounds a cavity. A valve body is connectable to the beverage mounting assembly. The valve body is connectable to the beverage mounting assembly via a clip. The clip is insertable into both the housing and the valve body to connect the valve body to the beverage mounting assembly. At least one actuator is disposed in the cavity of the housing. The actuator rotates from a closed position to an open position that actuates pressure to the valve body from a liquid source. The actuator is separate from the clip that connects the housing to the valve body.

There is also provided a mounting assembly that includes a housing having a top portion opposite a bottom portion, a front portion opposite a rear portion, and two opposite side portions. The front portion of the housing is connectable to a valve body of a beverage valve assembly. The housing has at least one actuator on the bottom portion that actuates pressure to the valve body from a liquid source.

There is additionally provided a mounting assembly that includes a housing that is connectable to a valve body. The housing has a housing wall that surrounds a cavity. The housing wall has at least two openings therethrough that are aligned to provide access through the cavity. At least one actuator has an aperture therethrough and rotates in the cavity. The actuator rotates from a closed position covering the two openings to an open position that aligns the two openings with the aperture uncovering the two openings to actuate pressure to the valve body from a liquid source.

The above-described and other features and advantages of the present disclosure will be appreciated and understood by those skilled in the art from the following detailed description, drawings, and appended claims.

DESCRIPTION OF THE PREFERRED EMBODIMENT

Figure 2:
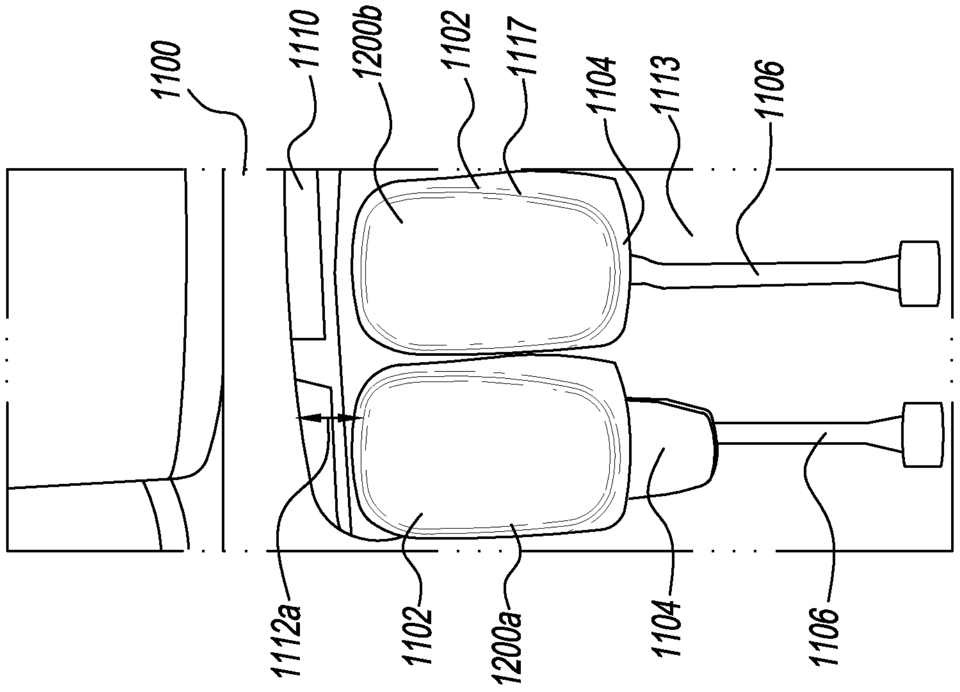
Fig. 2 (Prior Art)
FIG. 2 is a front view of another exemplary embodiment of a beverage dispenser of the prior art.
Figure 1:
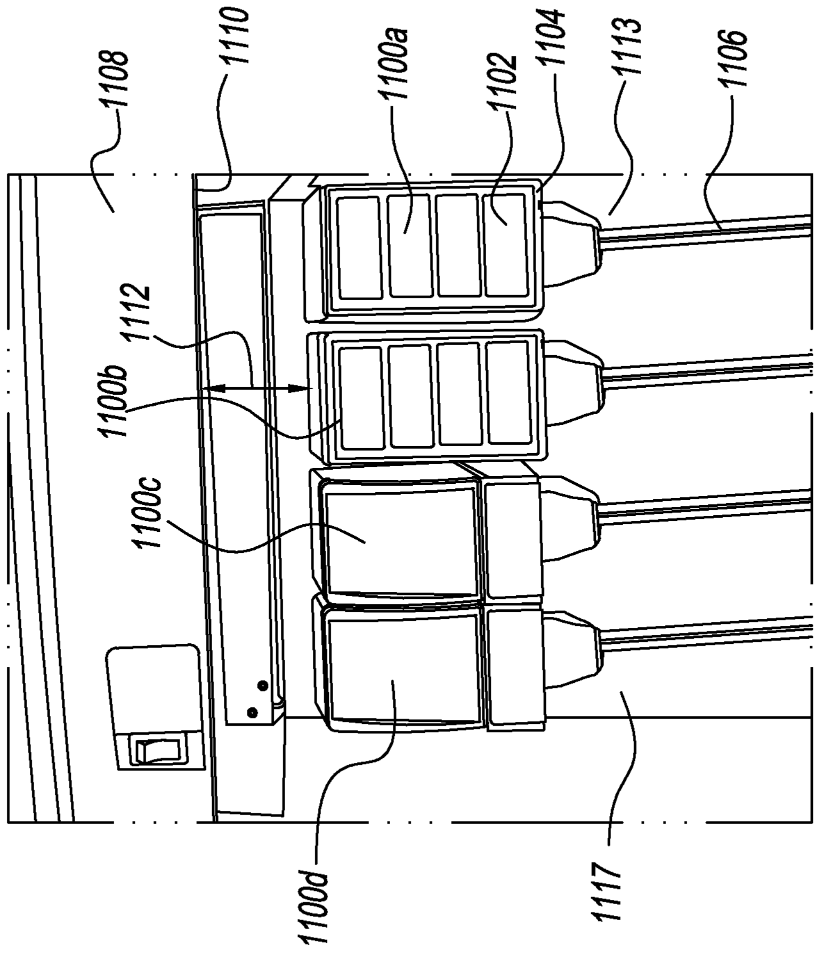
Fig. 1 (Prior Art)
FIG. 1 is a front view of an exemplary embodiment of a beverage dispenser of the prior art.
Figure 3:
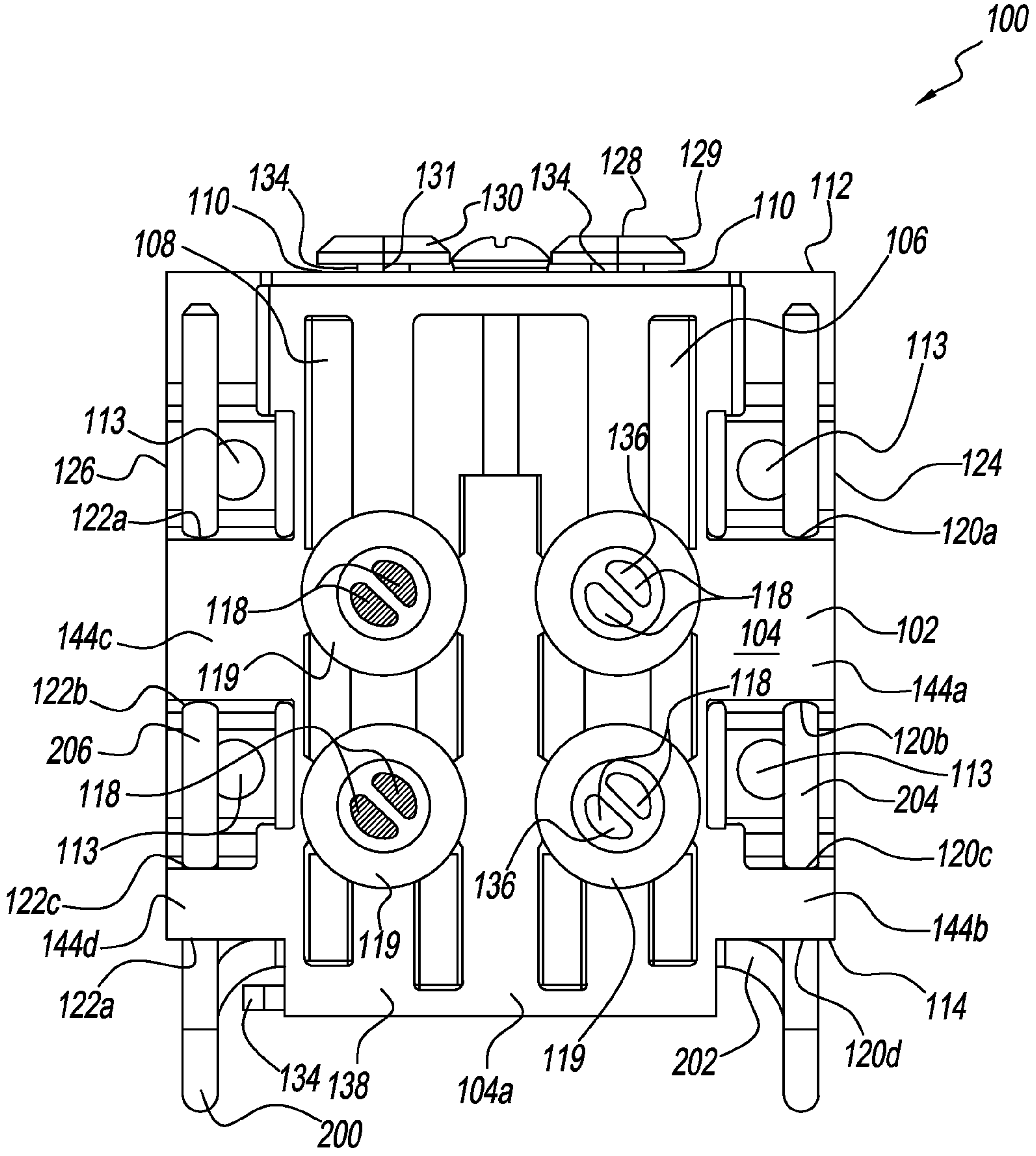
FIG. 3 is a front view of an exemplary embodiment of a mounting assembly of the present disclosure.

FIG. 3 shows an exemplary embodiment of a mounting assembly 100 according to the present disclosure. Mounting assembly 100 has a housing 102. Housing 102 has housing wall 104. Housing wall 104 has a plurality of wall openings 113 adjacent a perimeter of mounting assembly 100. Wall openings 113 are sized so that fasteners, for example, screws, can pass through each of wall openings 113 to connect mounting assembly 100 to the beverage dispenser.

Figure 4:
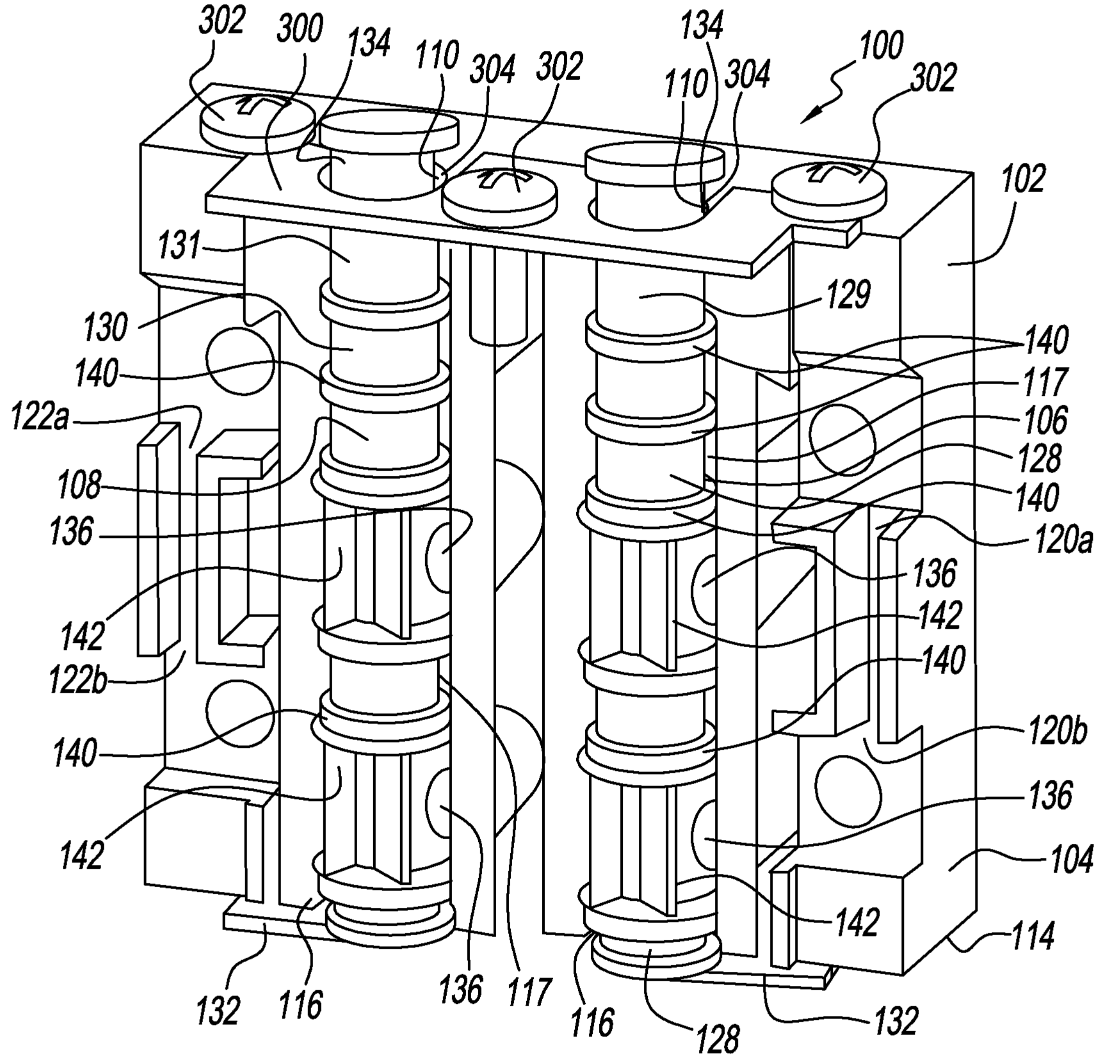
FIG. 4 is front perspective cross-sectional view of the mounting assembly of FIG. 3.

Housing wall 104 forms conduits 106 and 108. Conduits 106 and 108 each have an opening 110 at a top portion 112 of housing 102 and, as shown in FIG. 4, an opening 116 at a bottom portion 114 of housing 102. As shown in FIG. 4, a cavity 117 extends from opening 110 to opening 116.

Figure 5:
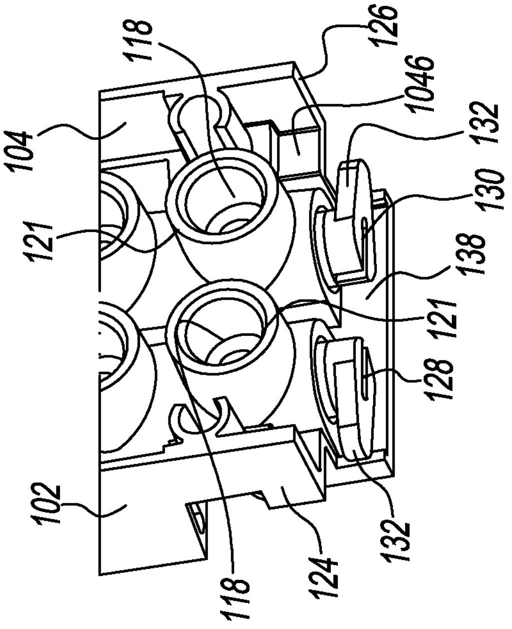
FIG. 5 is an enlarged partial rear side perspective view of the mounting assembly of FIG. 3.

As shown in FIG. 3, each of conduits 106 and 108 has a plurality of holes 118. Each of plurality of holes 118 may be a single hole or more than one hole. Plurality of holes 118 are each show as two holes in FIG. 3 separated by a partition that is positioned on a 45 degree angle or diagonally between the two holes. Plurality of holes 118 are through a front portion 104*a* of housing wall 104 and, as shown in FIG. 5, through a rear portion 104*b* of housing wall 104 so that the plurality of holes are aligned to form openings through conduits 106 and 108. As shown in FIG. 3, each of said plurality of holes 118 is surrounded by a sleeve 119 that protrudes away from each of the pair of holes 118. Sleeve 119 is a cylindrical tubular shape.

Housing wall 104 forms a first loop 144*a* and a second loop 144*b* on side 124 and a third loop 144*c* and a fourth loop 144*d* on side 126 of housing 102. Loops 144*a*, 144*b*, 144*c*, 144*d* are tubular in shape. First loop 144*a* has openings 120*a*, 120*b*, second loop 144*b* has openings 120*c*, 120*d*, third loop 144*c* has openings 122*a*, 122*b*, and fourth loop 144*d* has openings 122*c*, 122*d* through housing wall 104.

Mounting assembly 100 has spindles 128 and 130. Spindle 128 has a spindle body 129 and spindle 130 has a spindle body 131. Spindle body 129 is removably connectable to housing 102 in conduit 106 and the spindle body 131 is removably connectable to housing 102 in conduit 108. As shown in FIG. 4, each of spindle bodies 129 and 130 have a plurality of apertures 136 therethrough so that spindles 128 and 130 are rotatable in conduits 106 and 108 from a closed position covering plurality of openings 118 to an open position that aligns apertures 136 and pair of holes 118 uncovering the pair of holes 118. As shown in FIG. 3, spindle 128 is shown in the open position and spindle 130 is show in the closed position.

A clip 200 is removably connectable to housing 102 to removably connect a valve body 400 to mounting assembly 100. Clip 200 has a middle portion 202, a first side portion 204 and a second side portion 206. In a connected position, first side portion 204 is threaded through openings 120*a*, 120*b* of first loop 144*a* and openings 120*c*, 120*d* of second loop 144*b*. Second side portion 206 is threaded through openings 122*a*, 122*b* of third loop 144*c* and openings 122*c*, 122*d* of fourth loop 144*d*.

Referring to FIG. 4, spindles 128 and 130 are cylindrical shaped. Spindles 128 and 130 may each have ribs 140. Ribs 140 are bearing surfaces of spindles 128 and 130 that contact housing wall 104 surrounding cavities 117 of conduits 106 and 108. Ribs 140 facilitate smooth rotation. Spindles 128 and 130 are connected to a sealing material 142 that surrounds apertures 136. Sealing material 142 is flexible so that sealing material 142 is compressed within conduits 106 and 108 and abuts housing wall 104 surrounding cavities of conduits 106 and 108 providing a seal therebetween. Sealing material 142 covers holes 118 in the closed position sealing conduits 106 and 108. Plurality of holes 118 having two holes separated by the partition that is positioned on a 45 degree angle or diagonally between the two holes facilitates insertion of spindle 128 into conduit 106 and insertion of spindle 130 into conduit 108 without damaging sealing material 142.

Spindle bodies 129 and 130 each have a protrusion 132 and a slot 134. Protrusions 132 extend substantially perpendicular to the spindle bodies 129 and 130. Each of slots 134 is a depression in one of spindle bodies 129 and 130. Protrusion 132 and slots 134 are outside of conduits 106 and 108 when spindle bodies 129 and 130 are in conduits 106 and 108, respectively. Spindles 128 and 130 are in the closed position in FIG. 4.

Housing 102 is connected to a plate 300. Plate 300 is connected to housing 102, for example, by bolts 302. Plate 300 has holes 304. Spindles 128 and 130 pass through holes 304 so that plate 300 fits in slots 134.

Referring to FIG. 5, housing wall 104 has a wall 138 that extends adjacent to protrusions 132 of each of spindles 128 and 130 when spindle 128 is within conduit 106 and spindle 130 is within conduit 108. Protrusion 132 of spindle 128 is positioned adjacent side 124 in the closed position and protrusion 132 of spindle 130 is positioned adjacent side 126 in the closed position. Protrusion 132 of spindle 128 is rotated about 90 degrees away from wall 138 from the closed position to the open position and protrusion 132 of spindle 130 is rotated about 90 degrees away from wall 138 from the closed position to the open position.

Each of the pair of plurality of holes 118 that are aligned to form an opening through one of conduits 106 and 108 connects to tubing that connects to a source of liquid. The liquid, for example, is carbonated water, still water, or flavor ingredients. Each of the pair of plurality of holes 118 are surrounded by a connector wall 121 on rear portion 104*b* of housing 102. Connector wall 121 connects to the tubing that connects to a source of liquid.

Figure 6:
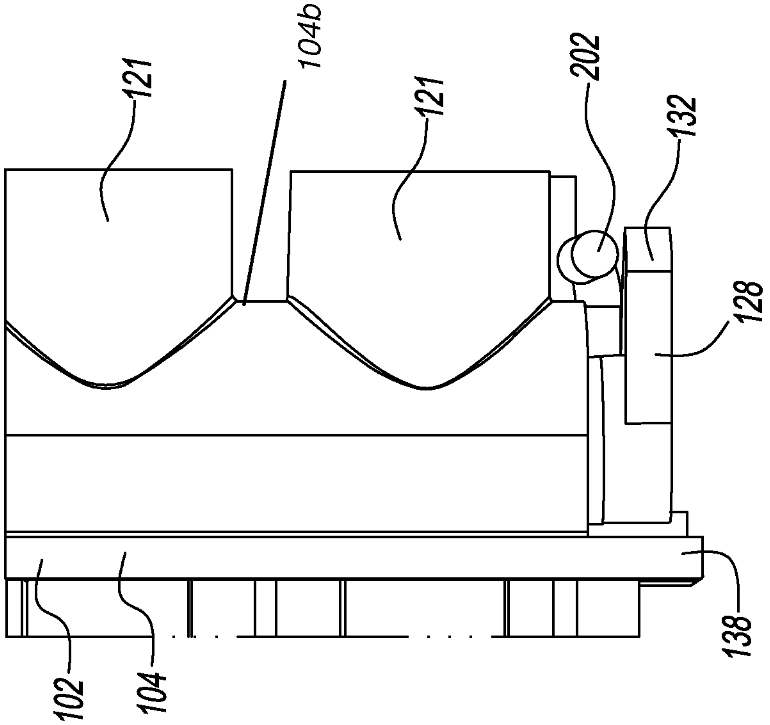
FIG. 6 is an enlarged partial side view of the mounting assembly of FIG. 3.

Referring to FIG. 6, wall 138 is sized to extend beyond and cover protrusions 132.

Figure 7:
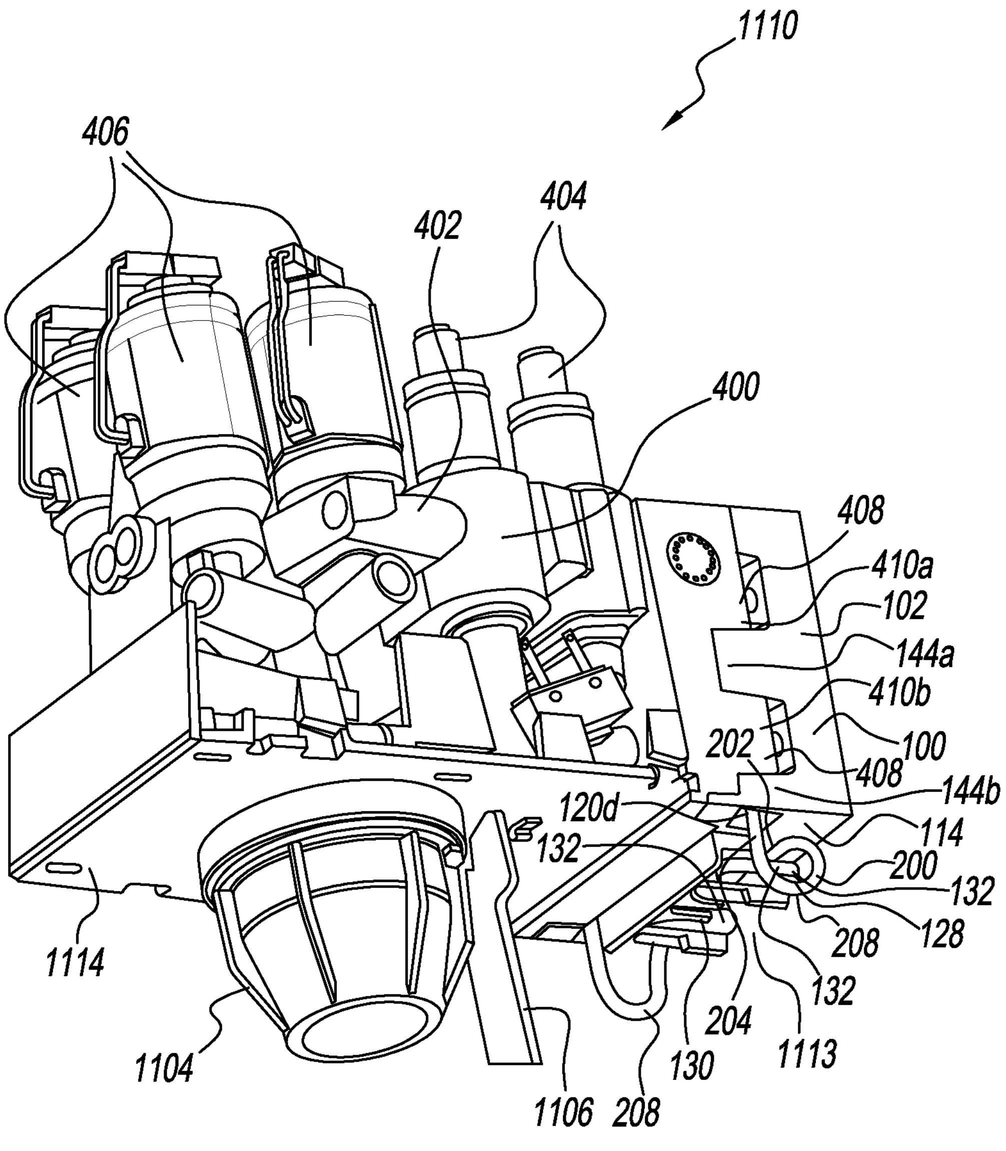
FIG. 7 is a front side perspective view of the mounting assembly of FIG. 3 connected to a valve body of the present disclosure.
Figure 8:
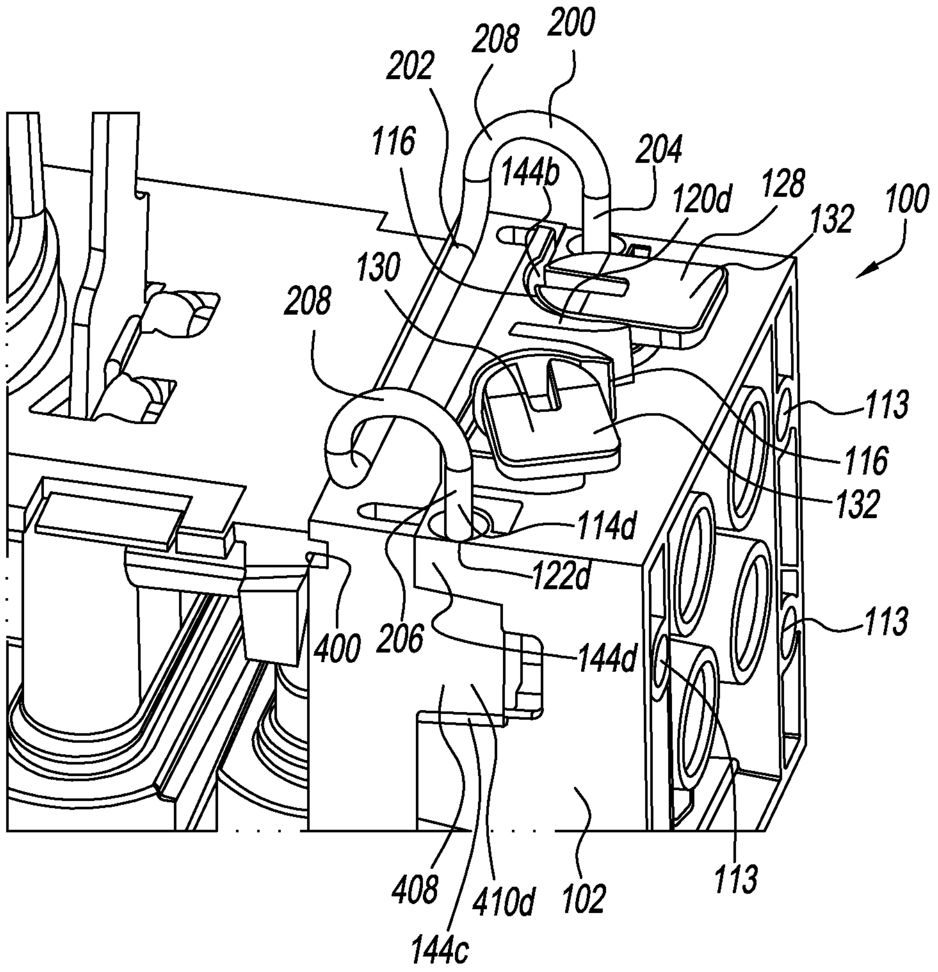
FIG. 8 is an enlarged partial bottom side perspective view of the mounting assembly of FIG. 3 connected to the valve body FIG. 7.
Figure 9:
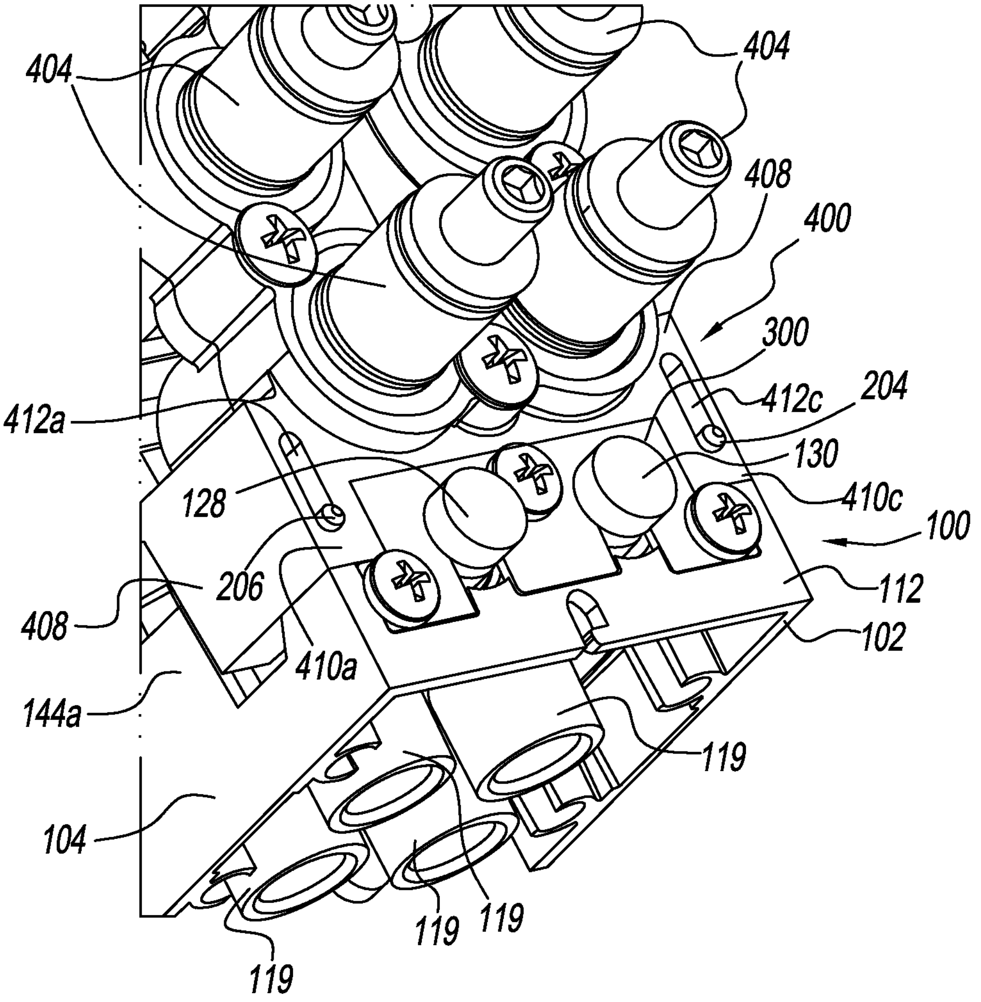
FIG. 9 is an enlarged partial top side perspective view of the mounting assembly of FIG. 3 and the valve body of FIG. 7.

Referring to FIGS. 7-9, valve body 400 is connectable to mounting assembly 100. Valve body 400 has a connecting portion 408. Connecting portion 408 has a first connecting protrusion 410*a* and a second connecting protrusion 410*b* on a first side and a third connecting protrusion 410*c* and a forth connecting protrusion 410*d* on a second side that is opposite to the first side. First loop 144*a* has a complimentary shape to first connecting protrusion 410*a* and second connecting protrusion 410*b* to fit therebetween so that openings 120*a*, 120*b* align with both an opening 412*a* through first connecting protrusion 410*a* and an opening (not shown) through second connecting protrusion 410*b*. Second connecting protrusion 410*b* has a complimentary shape to fit between first loop 144*a* and second loop 144*b* so that openings 120*c*, 120*d* align with the opening through second connecting protrusion 410*b*. Third loop 144*c* has a complimentary shape to third connecting protrusion 410*c* and forth connecting protrusion 410*d* to fit therebetween so that openings 122*a*, 122*b* align with both an opening 412*c* through third connecting protrusion 410*c* and an opening (not shown) through forth connecting protrusion 410*d*. Forth connecting protrusion 410*d* has a complimentary shape to fit between third loop 144*c* and fourth loop 144*d* so that openings 122*c*, 122*d* align with the opening through forth connecting protrusion 410*d*.

Valve body 400 is connected to mounting assembly 100 in a connected position. Clip 200 and plate 300 connect valve body 400 to mounting assembly 100. Plate 300 abuts valve body 400 in the connected position. First side portion 204 of clip 200 passes through openings 120*c*, 120*d* of second loop 144*b*, the opening through second connecting protrusion 410*b*, openings 120*a*, 120*b* of first loop 144*a*, and opening 412*a* of first connecting protrusion 410*a* in the connected position. Second side portion 206 of clip 200 passes through openings 122*c*, 122*d* of fourth loop 144*d*, the opening through forth connecting protrusion 410*d*, openings 122*a*, 122*b* of third loop 144*c*, and opening 412*c* through third connecting protrusion 410*c* in the connected position.

Referring to FIG. 7, middle portion 202 of clip 200 is adjacent bottom portion 114 of housing 102 in the connected position. When spindles 128, 130 are in the open position, protrusions 132 are positioned over middle portion 202 of clip 200 so that middle portion 202 is between housing 102 and protrusions 132 to maintain clip 200 in the connected position. Middle portion 202 connects to each of first side portion 204 and second side portion 206 by a curved portion 208 that extends below middle portion 202 in the connected position. Curved portions 208 allow grasping by a hand of a user. Alternatively, as shown in FIG. 8, middle portion 202 of clip 200 is adjacent valve body 400 in the connected position so that curved portions 208 and middle portion 202 of clip allow grasping by a hand of a user.

Figure 10:
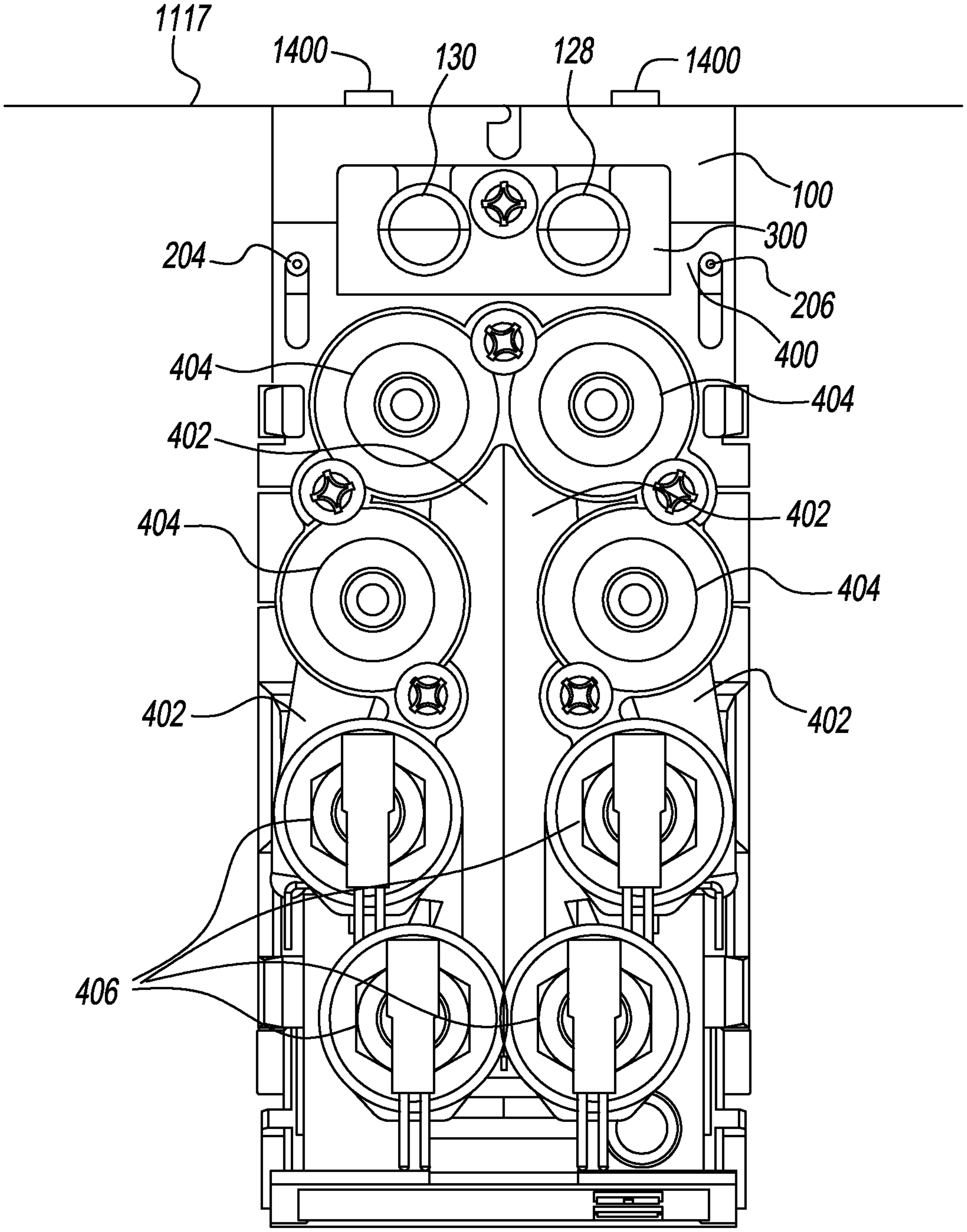
FIG. 10 is a top view of the mounting assembly of FIG. 3 that is connected to the beverage dispenser and the valve body of FIG. 7.

Referring to FIG. 10, mounting assembly 100 is connectable to dispenser wall 1117. Dispenser wall 1117 may have openings (not shown) that align with wall openings 113. Mounting assembly 100 is connectable to dispenser wall 1117, for example, by screws 1400 that pass through wall openings 113 and openings of dispenser wall 1117 and mate with nuts to secure mounting assembly 100 to dispenser wall 1117. Valve body 400 connects to a bottom plate 1114 that connects to nozzle 1104 and lever 1106.

Referring to FIGS. 7, 9 and 10, valve body 400 has a plurality of conduits 402. Each of conduits 402 is connected to one of plurality of holes 118 of mounting assembly 100 on a first end. Conduits 402 funnel liquid into a diffuser 1120 and/or nozzle 1104 prior to the exit of liquid out of nozzle 1104. Valve body 400 has four conduits 402. Each of four conduits 402 has one of flow control assemblies 404 and one of solenoids 406 for controlling flow of liquid therethrough. Each of flow control assemblies 404 is a metering device which, through a user set spring compression, allows fluid to flow at a given flow rate based on viscosity, pressure and spring setting. Solenoids 406 are electrically actuated members that drive a normally closed plunger/seal assembly to an open position allowing fluid to progress through its respective conduit. When current flows to the coil on each of solenoids 406, the current creates a magnetic field which acts to pull the plunger assembly up off of its seat.

Figure 11:
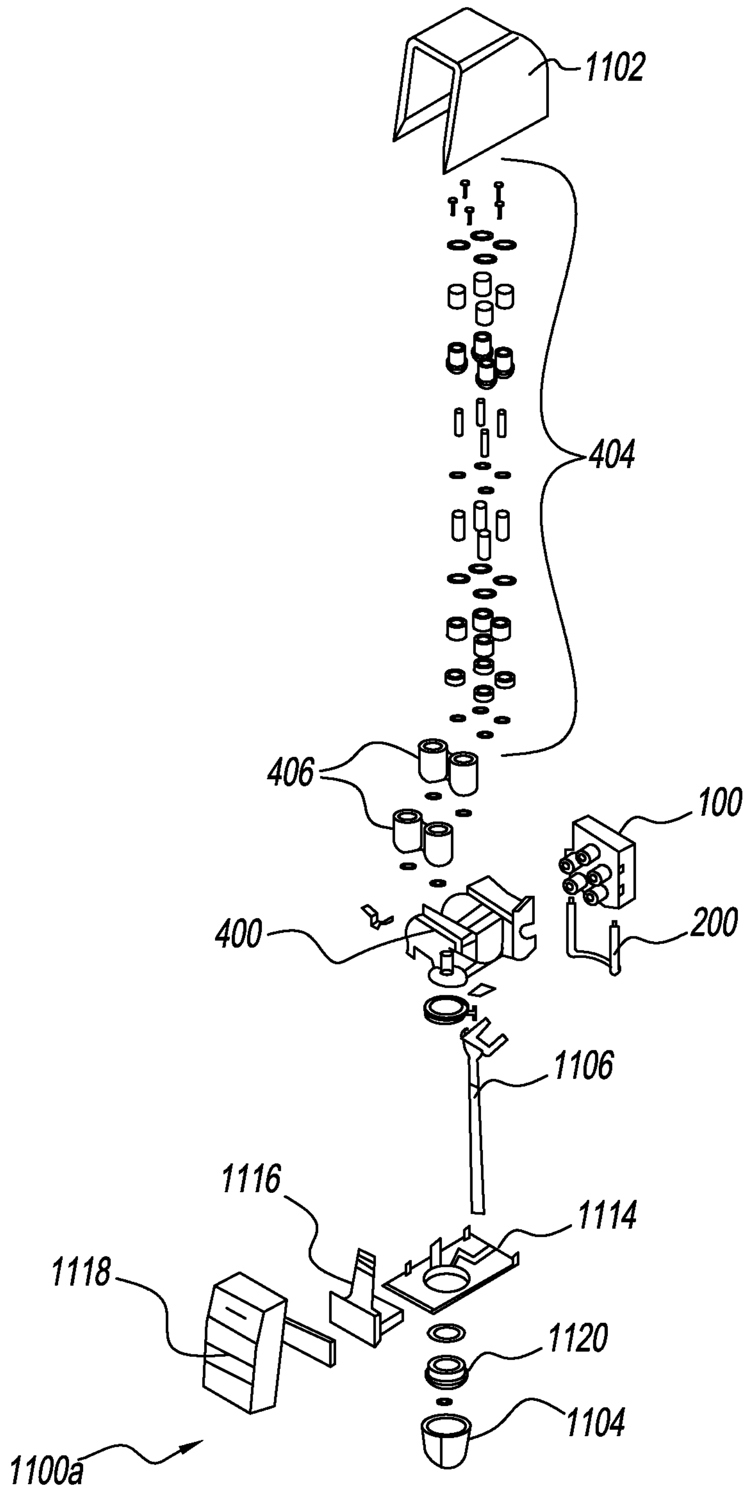
FIG. 11 is exploded front side perspective view of the mounting assembly of FIG. 3, valve body of FIG. 7 and a portion of a beverage dispenser.

Referring to FIG. 11, beverage valve assembly 1100*a* has an electronic module 1116 and a keypad 1118. Electronic module 1116 controls flow control assemblies 404 and solenoids 406 to dispense a beverage as is known in the art. Electronic module 1116 controls dispense of the beverage based on user input through keypad 1118 and actuation via lever 1106. Nozzle 1104 may have a diffuser 1120 to control flow of liquid therethrough. Electronic module 1116, keypad 1118, lever 1106 and nozzle 1104 all connect to bottom plate 1114 that connects to valve body 400. Valve body 400 connects to mounting assembly 100, flow control assemblies 404 and solenoids 406 and is covered by cover 1102 that connects to bottom plate 1114.

Mounting assembly 100 may be made of material, for example, metal and/or plastic.

In use, as shown in FIGS. 7 and 10, housing 102 of mounting assembly 100 is connected to a beverage valve assembly, for example, by screws that pass through wall openings 113 and the openings of dispenser wall 1117 and mate with nuts to secure mounting assembly 100 to dispenser wall 1117.

Spindle 128 is inserted into conduit 106 and spindle 130 inserted into conduit 108 by accessing openings 116 at bottom portion 114 of housing 102 from lower space 1113. Spindle 128 is inserted into conduit 106 and spindle 130 inserted into conduit 108 so that protrusions 132 and slots 134 extend outside of conduits 106 and 108, and plate 300 fits in slots 134. Protrusion 132 of spindle 128 is positioned adjacent side 124 and protrusion 132 of spindle 130 is positioned adjacent side 126 so that spindles 128 and 130 are in the closed position covering plurality of openings 118.

Each of the pair of plurality of holes 118 that are aligned to form an opening through one of conduits 106 and 108, as shown in FIG. 3, is connected to tubing that connects to a source of liquid. The source of liquid, for example, is carbonated water, still water, or flavor ingredients that is pressurized. The tubing connects to connector wall 121 surrounding plurality of holes 118 through housing 102.

Valve body 400 is connected housing 102 that is connected to dispenser wall 1117. Valve body 400 is positioned adjacent housing 102 so first loop 144*a* is between first connecting protrusion 410*a* and second connecting protrusion 410*b* so that openings 120*a*, 120*b* align with both opening 412*a* through first connecting protrusion 410*a* and the opening through second connecting protrusion 410*b*. Second connecting protrusion 410*b* is positioned between first loop 144*a* and second loop 144*b* so that openings 120*c*, 120*d* align with the opening through second connecting protrusion 410*b*. Third loop 144*c* is positioned between third connecting protrusion 410*c* and forth connecting protrusion 410*d* so that openings 122*a*, 122*b* align with both opening 412*c* through third connecting protrusion 410*c* and the opening through forth connecting protrusion 410*d*. Forth connecting protrusion 410*d* is positioned to fit between third loop 144*c* and fourth loop 144*d* so that openings 122*c*, 122*d* align with the opening through forth connecting protrusion 410*d*. First side portion 204 of clip is passes through openings 120*c*, 120*d* of second loop 144*b*, the opening through second connecting protrusion 410*b*, openings 120*a*,

120*b* of first loop 144*a*, and opening 412*a* of first connecting protrusion 410*a*. Second side portion 206 of clip 200 passes through openings 122*c*, 122*d* of fourth loop 144*d*, the opening through forth connecting protrusion 410*d*, openings 122*a*, 122*b* of third loop 144*c*, and opening 412*c* through third connecting protrusion 410*c*. Valve body 400 also connects to a bottom plate 1114 that connects to nozzle 1104 and lever 1106.

Once valve body 400 is connected to mounting assembly 100, protrusion 132 of spindle 128 is rotated about 90 degrees from the closed position to the open position and protrusion 132 of spindle 130 is rotated about 90 degrees from the closed position to the open position to actuate pressure to valve body 400 and beverage valve assembly 1100*a* from the source of liquid. Protrusions 132 in the open position are below middle portion 202 of clip 200 locking clip 200 in place. The remaining components of the beverage valve assembly are assembled, and the beverage valve assembly is ready for operation.

To service the valve body 400 or mounting assembly 100 of the beverage valve assembly, protrusion 132 of spindle 128 is rotated about 90 degrees from the open position to the closed position and protrusion 132 of spindle 130 is rotated about 90 degrees from the open position to the closed position blocking the passage of the liquid to valve body 400 to depressurize valve body 400 and beverage valve assembly 1100*a* closing communication between valve body 400 and the source of liquid. In the closed position, clip 200 may be removed from housing 102 and valve body 400 so that valve body 400 may be removed from housing 102 to be removed for service. In addition, the screws may be removed from housing 102 and dispenser wall 1117 so that mounting assembly may be removed for service.

Mounting assembly 100 connects housing 102 to valve body 400 by clip 200, and separately actuates pressure to valve body 400 by rotating spindles 128 and 132. Thus, mounting assembly 100 allows connection of valve body 400 to mounting assembly 100, and then actuating the pressure from the liquid source to valve body 400 by mounting assembly 100 for ease of installation.

Access by a user to actuate pressure to the valve body 400 and beverage valve assembly 1100*a* is located at bottom portion 114 of housing 102 by rotating spindles 128 and 132. Therefore, it is not necessary for users to access mounting assembly 100 through upper space 1112 for installation and service of valve body 400 and mounting assembly 100. Rather, mounting assembly 100 can be accessed through lower space 1113 that is greater in size than upper space 1112 for installation and service of valve body 400 and mounting assembly 100. Protrusions 132 are sized so that minimal clearance is needed in rear space 1115 for rotating protrusions 132 from the closed position to the open position.

Wall 138 protruding downward covers spindles and a majority of clip 200. Wall 138 and positioning protrusions 132 of spindles 128, 130 over middle portion 202 of clip minimizes vandalism and clip 200 removal by unauthorized users.

It should also be recognized that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A mounting assembly for a beverage dispenser, comprising:

a housing, wherein the housing has a housing wall that surrounds a cavity, wherein the housing has a housing conduit in the cavity, wherein the housing wall has a top portion with a top opening therethrough and a bottom portion with a bottom opening therethrough, so that the housing conduit is between the top opening and the bottom opening, and wherein the housing conduit has a hole therethrough;

a valve body having a valve body conduit therethrough;

a clip removably insertable into each of the housing and the valve body, wherein the clip connects the housing to the valve body; and a spindle having an aperture therein and a longitudinal axis, wherein the spindle is in the housing conduit, wherein the spindle rotates in the conduit about the longitudinal axis from a first position to a second position, wherein the spindle has a first end that projects through the top opening of the housing and a second end that projects through the bottom opening of the housing, wherein the spindle further comprises a protrusion at one of the first end and the second end that projects away from the spindle in a direction perpendicular to the longitudinal axis, wherein when the spindle is in the first position, the hole in the housing conduit is in communication with the valve body conduit via the aperture in the spindle, and the protrusion surrounds a portion of the clip, thus preventing removal of the clip from the housing and the valve body, and wherein when the spindle is in the second position, the aperture in the spindle does not align with the hole in the housing conduit and the valve body conduit, thus preventing communication between the hole in the housing conduit and the valve body conduit, and the protrusion does not cover the position of the clip, thus allowing for removal of the clip from the housing and the valve body.

2. The mounting assembly of claim 1, wherein the spindle is removably connected to the housing.

3. The mounting assembly of claim 1, wherein the valve body has a valve body protrusion and a valve body indentation, and the housing has a housing protrusion and a housing indentation, and wherein the valve body protrusion mates with the housing indentation, and the housing protrusion mates with the valve body indentation.

4. The mounting assembly of claim 3, wherein the valve body protrusion has a shape that corresponds to a shape of the housing indentation, and the housing protrusion has a shape that corresponds to a shape of the valve body indentation.

5. The mounting assembly of claim 3, wherein the valve body protrusion and the housing protrusion each have a hole therethrough, and a second portion of the clip passes through each of the holes.

6. The mounting assembly of claim 1, wherein the housing has a plurality of housing conduits in the cavity, each with a hole therethrough, the valve body has a plurality of valve body conduits therethrough, a plurality of spindles, one in each housing conduit and each with an aperture therein, so that each hole in each of the plurality of conduits is in communication with one of the valve body conduits via one of the apertures in one of the spindles.

7. The mounting assembly of claim 1, wherein the housing conduit has a plurality of holes therein, the spindle has a plurality of apertures therein, and the valve body has a plurality of conduits therethrough, so that when the spindle is in the first position each of the holes in the housing conduit is in communication with one of the valve body conduits via one of the apertures.

8. The mounting assembly of claim 1, wherein the housing has an extension wall that extends beyond and covers the protrusion of the spindle when the spindle is in the cavity.

9. The mounting assembly of claim 1, wherein the spindle is inserted into the cavity by accessing an opening at the bottom portion of the housing.

* * * * *